H. CLEMENT.
DIAGNOSTIC INSTRUMENT.
APPLICATION FILED JUNE 10, 1916.

1,281,136.

Patented Oct. 8, 1918.

Inventor
Hans Clement
By his Attorneys

UNITED STATES PATENT OFFICE.

HANS CLEMENT, OF NEW YORK, N. Y., ASSIGNOR TO GENERAL OPTICAL COMPANY, INC., A CORPORATION OF NEW YORK.

DIAGNOSTIC INSTRUMENT.

1,281,136.  Specification of Letters Patent.  Patented Oct. 8, 1918.

Application filed June 10, 1916. Serial No. 102,812.

*To all whom it may concern:*

Be it known that I, HANS CLEMENT, a citizen of the United States, residing at the city of New York, in the borough of Bronx and State of New York, have invented certain new and useful Improvements in Diagnostic Instruments, of which the following is a full, clear, and exact description.

This invention relates to diagnostic instruments such as retinoscopes, ophthalmoscopes, and similar instruments which are provided with small apertures or sight openings and have an illuminating attachment usually consisting of a small electric incandescent lamp whose rays are reflected by a mirror in front of the sight opening, which mirror is necessarily provided with a sight opening in alinement with the sight opening in the instrument so as not to impair the line of vision. Since instruments of this character are generally used in a dark room, any other source of light other than the beam of light directed upon the part to be examined by the mirror, is objectionable and for this reason it has been common to provide a chamber to the rear of the mirror into which the light rays which pass through the opening in the mirror are projected and absorbed. It has been found, however, that with the type of absorbing chamber heretofore used for this purpose, portions of the light rays which enter this chamber strike the walls thereof and are reflected back through the sight opening clouding the brightness and clearness of the spot of light which is projected upon the portion to be examined. The clouding effect is due to the light rays striking the walls of the sight opening in the mirror at an angle, which causes annular bands or rings of light to appear surrounding the spot of light projected by the mirror. These bands of light are generally referred to as "reflexes" and are commonly known among users of instruments of this character.

The primary object of this invention is to eliminate any of these "reflexes" which are caused by the reflected rays from the chamber to the rear of the mirror and in accordance with this object, the invention consists in providing a chamber, the walls of which are so arranged that the light rays which pass through the sight opening and strike the same, are reflected in a direction in which it is impossible for them to again pass through the sight opening or aperture in the mirror, and are therefore completely absorbed within the chamber. The particular shape of the chamber or the contour of its walls, as long as they perform this function, is not important but by way of illustration two forms which the chamber may take are shown in connection with a retinoscope and an ophthalmoscope, respectively.

In the accompanying drawings, therefore, Figure 1 shows an illuminated retinoscope having a light absorbing chamber constructed in accordance with the principles of the invention, parts being in section to more clearly disclose the novel features;

Figure 2:
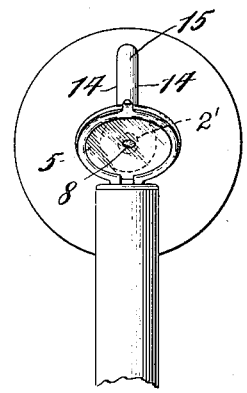
Fig. 2 is a front elevation of the retinoscope.
Figure 1:
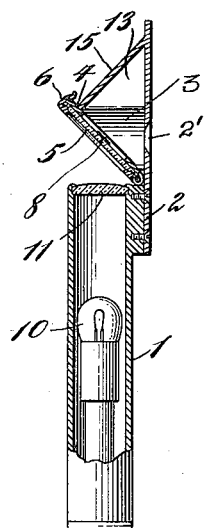

Referring first to Figs. 1 and 2, the retinoscope shown therein comprises a hollow stem or supporting tube 1 to the upper end of which is attached a circular disk or plate 2 having the usual sight opening 2' therein. Extending from the front face thereof is a cylindrical casing 3 provided with an annular seat 4 upon which a circular mirror 5 is mounted, which mirror is held in position by a pivoted retaining ring 6. The seat 4 is so disposed that the mirror is maintained at approximately a 45° angle to the plate 2, which mirror has the usual sight or peep opening 8 therein which is arranged in horizontal alinement with the sight opening 3 in the plate 2. The supporting tube 1 is mounted upon a handle 9, which carries an electric incandescent lamp 10 projecting into the hollow tube. The rays from this lamp are therefore directed vertically upwardly and strike the mirror 5 and are then reflected in a substantially horizontal direction or in a direction parallel to the alining sight openings 3 and 8. A condensing lens 11 is preferably interposed between the lamp and the mirror which will focus the rays from the lamp upon the mirror and cause them to be concentrated upon the object to be examined in the form of a small bright spot of light, The supply of electric current for the incandescent lamp is supplied from a battery (not shown) which is positioned within the handle 9.

Thus far described the retinoscope is similar to the retinoscope at present marketed and the present invention relates to the particular shape of the casing 3 which supports the mirror and provides an absorbing chamber to the rear of the mirror to absorb the light rays which pass through the sight opening 8. In the form shown, the casing 3 is of a generally cylindrical shape and is provided with a triangular-shaped extension 13, the side walls 14 of which are parallel and connected by a curved wall 15. The front wall 15 is, as will be clear from Fig. 1, arranged at substantially 90° to the mirror 5. It is, therefore, evident that the light rays which pass vertically up through the sight opening 8 and strike the curved wall 15 will be reflected against the plate 2 at such an angle that they cannot again pass through the sight opening 8 and thereby cause the objectionable annular bands or rays of light known as "reflexes." The inner walls of the chamber formed by the casing 3 and the triangular-shaped portion 13, are preferably blackened so that they will readily absorb the light rays which pass thereinto.

Figure 3:
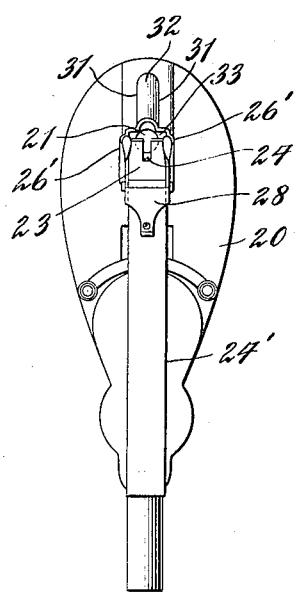
Fig. 3 is a front elevation of an ophthalmoscope showing an absorbing chamber of slightly modified construction.
Figure 4:
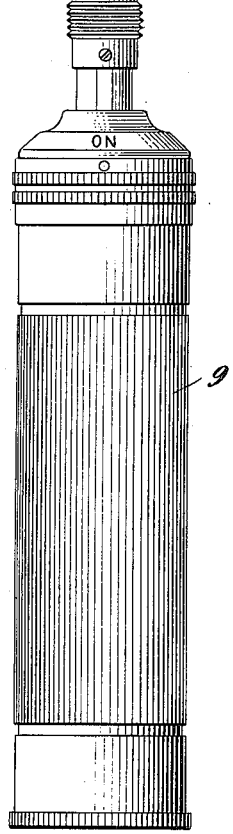
Fig. 4 is a side elevation of an ophthalmoscope shown in Fig. 3.
Figure 4:
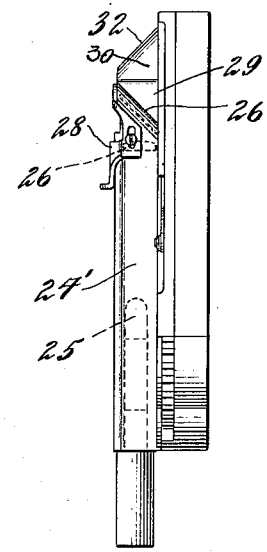

In Figs. 3 and 4 there is shown a slightly modified form of absorbing chamber which is suitable for use with an ophthalmoscope. The casing of the ophthalmoscope in which is mounted the lens carriers (not shown) is designated 20 and is provided with the usual sight opening 21, medially disposed in the upper part of the casing.

Arranged in the horizontal path in alinement with the sight opening is an angularly-disposed mirror 23 which instead of having a sight opening is slotted as at 24 so as to not impair the line of vision of the person using the instrument. This mirror forms a part of the illuminating attachment which is similar to the ones shown in Figs. 1 and 2, the ophthalmoscope being provided with a hollow supporting tube 24' which is adapted to fit upon a handle similar to the handle 9. The handle carries an electric incandescent lamp 25 shown partially in dotted lines in Fig. 4, the tube being provided with the usual condensing lens 26 to focus the rays from the incandescent lamp upon the mirror.

The mirror 23 is removably mounted in the upper end of the hollow supporting tube, the tube 24 being provided with ridges 26', which provides seats for the side edges of the mirror, the same being retained in position by a yoke-shaped keeper 28 slidably mounted upon the tube. The hollow supporting tube is continued above the mirror to provide an absorbing chamber 29 for the light rays which pass through the slot in the mirror. This chamber as in the form shown in Figs. 1 and 2, is provided with a triangular extension 30, the side walls 31 of which are parallel and are connected by a rounded front face 32. In order that the mirror may be removable, the walls of this chamber are not continued downwardly so as to form a closed chamber to the rear of the mirror as in the form shown in Figs. 1 and 2, but a small opening is left as at 33. This opening is immaterial since it has been found that when the light rays from the incandescent lamp pass through the slot in the mirror, they strike the angularly-disposed rounded wall of the triangular extension and will be completely absorbed in the chamber so that practically none of the light will pass outwardly through the opening 33.

Other forms of absorbing chambers in which the rays which strike the walls thereof and be reflected in such a direction that they cannot pass through the sight opening in the mirror, may be provided, and it is the intention that such constructions shall come within the scope of the invention as will be particularly pointed out in the appended claims.

I claim:

1. In a diagnostic instrument, a plate having a sight opening therein, a mirror angularly disposed with respect to said plate having a sight opening therein in alinement with said sight opening in said plate, a source of illumination having its rays striking said mirror and part of said rays passing through the sight opening therein, a chamber surrounding said mirror having a triangular-shaped extension projecting upwardly therefrom, said extension being of materially less width than said chamber, whereby the rays of light passing through said mirror are concentrated and absorbed in said extension chamber.

2. In a diagnostic instrument, a plate having a sight opening therein, a mirror angularly disposed with respect to said plate having a sight opening therein in alinement with said sight opening in said plate, a source of illumination having its rays striking said mirror, a part of said rays passing through the sight opening therein, a triangular-shaped chamber arranged above said mirror in vertical alinement with the sight opening therein, said chamber being of slightly greater width than the sight opening in said mirror, whereby the light rays passing through said sight opening are concentrated and absorbed in said triangular chamber.

3. In a diagnostic instrument, a plate having a sight opening therein, a mirror angularly disposed with respect to said plate having a sight opening therein in alinement with said sight opening in said plate, a source of illumination having its rays striking said mirror, a part of said rays passing through the sight opening therein, and a ray-absorbing chamber disposed above said mirror having substantially parallel side walls spaced apart a distance slightly greater than the diameter of the sight opening in said mirror.

In witness whereof, I subscribe my signature, in the presence of two witnesses.

HANS CLEMENT.

Witnesses:
F. L. HIGGINS,
A. C. MOESCHEN.